United States Patent [19]

Dinner

[11] Patent Number: 5,611,659

[45] Date of Patent: Mar. 18, 1997

[54] METHOD AND A DEVICE FOR REDUCING THE GAP BETWEEN A STATIC PART AND A MOVABLE PART

[75] Inventor: Paul Dinner, West Missisauga, Canada

[73] Assignee: Europäische Atomgemeinschaft (Euratom), Plateau du Kirchberg, Luxembourg

[21] Appl. No.: 465,642

[22] Filed: Jun. 5, 1995

Related U.S. Application Data

[63] Continuation of PCT/EP93/03341, Nov. 29, 1993.

[30] Foreign Application Priority Data

Dec. 3, 1992 [LU] Luxembourg ............................... 88194

[51] Int. Cl.⁶ ..................................................... F01D 1/36
[52] U.S. Cl. .......................... 415/90; 415/170.1; 277/203; 277/16; 277/22
[58] Field of Search .................... 415/90, 170.1, 415/173.1, 173.4; 277/203, 16, 22, 72 FM

[56] References Cited

U.S. PATENT DOCUMENTS

| | | | |
|---|---|---|---|
| 2,646,065 | 7/1953 | Tyson | 277/16 |
| 2,799,522 | 7/1957 | King et al. | 277/16 |
| 3,091,469 | 5/1963 | Matt | 277/22 |
| 3,117,792 | 1/1964 | Glenn et al. | 277/22 |
| 3,129,947 | 4/1964 | Streck | 277/22 |
| 3,331,608 | 7/1967 | Charrault et al. | 277/22 |
| 3,357,706 | 12/1967 | Wilkinson | 277/22 |
| 3,836,156 | 9/1974 | Dunthorne . | |

FOREIGN PATENT DOCUMENTS

| | | | |
|---|---|---|---|
| 0451669 | 10/1991 | European Pat. Off. . | |
| 0493315 | 7/1992 | European Pat. Off. . | |
| 3936429 | 5/1991 | Germany . | |
| 6862596 | 3/1961 | United Kingdom | 277/16 |
| 94/12792 | 6/1994 | WIPO | 277/22 |

OTHER PUBLICATIONS

Patent Abstracts of Japan vol. 7, No. 145 (M–225)(1290) 24 Jun. 1983 & JP A 58 057 100 (Hitachi Seisakusho K.K) Apr. 5, 1983.

Primary Examiner—Edward K. Look
Assistant Examiner—Mark Sgantzos
Attorney, Agent, or Firm—Darby & Darby

[57] ABSTRACT

A method and device for reducing a gap between a static part and a movable part. The device is operated at cryo temperatures. A gap is defined between the static part and the movable part. A cryo coolant channel has a coolant fluid disposed therein. The channel is disposed in a housing wall of one of the static part and the movable part and is disposed adjacent to the gap. A gas is injected into the gap. The gas is condensable and has a liquid-solid conversion temperature above the temperature of the coolant fluid so that the gas becomes solid.

6 Claims, 1 Drawing Sheet

METHOD AND A DEVICE FOR REDUCING THE GAP BETWEEN A STATIC PART AND A MOVABLE PART

This is a continuation of international application Ser. No. PCT/EP93/03341, filed Nov. 29, 1993.

BACKGROUND OF THE INVENTION

1. Field of the Invention

The invention relates to a device for reducing the gap between a static part and a movable part in an apparatus operated at cryo temperatures.

2. Discussion of the Related Art

Because gas density varies inversely with temperature, it is desirable to dispose of mechanical vacuum pumps when operating at very low temperatures, referred to hereafter as cryo temperatures. For example, the density of a given gas increases by a factor 15 when cooled down from 300 K. to 20 K.

Mechanical pumps for high vacuum appliances require very small gaps between the movable and the static parts in order to reduce the back-flow of gases in the pump. If the pump is to be operated at low temperatures, these gaps must be extremely small (for example between 1 mm and 0.1 mm), since the back-flow increases with decreasing temperatures due to the low gas viscosity and due to the fact that the short free path at those low temperatures results in a laminar flow through the gap between the static and the movable part. Moreover, the mass flow is increased due to the higher density.

On the other hand, it is difficult to maintain small gaps between static and movable parts, especially at cryo temperatures, because of the difference in thermal expansion of the components of the pump during the cooling down or warming up. Thus, it would be useful to find a construction which ensures acceptable gaps during the temperature cycles, and which ensures the smallest possible gaps during the cryo-operation. In any case, it must be avoided that the movable and the static parts touch each other and become damaged.

From document U.S. Pat. No. 3,836,156, a method is known for reducing the gap between a static and a movable part. In this case, one of the parts is covered by a metallic wear coating which melts at a temperature slightly above the operation temperature, that means that it melts even if the temperature increases only slightly due to the rubbing contact between the two parts. However, this method is not susceptible to reduce variable gaps (for example due to thermal expansions).

Moreover, it has been proposed in EP-A-0 451 669 to coat the gap surfaces by a pasty material which is abraded during the running-in phase by the movable part.

SUMMARY OF THE INVENTION

The invention therefore aims to propose a device for reducing the gap between a static part and a movable part in an installation operated at cryo temperature, in which very small gaps between these parts are ensured at cryo temperature conditions in spite of the different thermal expansions during the cooling down to cryo temperature or during warming up. In the device according to the invention this object is achieved by the fact that a coolant channel is provided in the wall of one of the parts along the gap, this channel being part of a cryo cooling fluid circuit, and that means are provided for feeding to the gap zone a gas which is compatible with the operating environment of the installation and which presents a liquid-solid conversion temperature above the temperature of the cryo fluid.

The invention also refers to a method for operating such a device.

BRIEF DESCRIPTION OF THE DRAWING FIGURES

The invention will be explained hereafter by means of preferred embodiments and the attached drawings.

DETAILED DESCRIPTION OF THE PREFERRED EMBODIMENT

Figure 1:
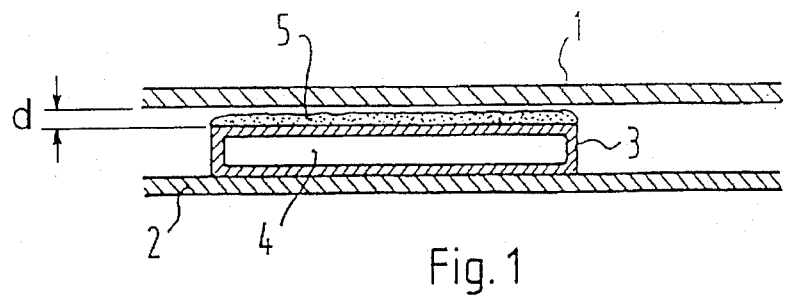
FIG. 1 shows schematically in cross-section a device according to the invention.

FIG. 1 shows a partial zone of the wall 1 of a vacuum pump rotor which rotates in face of a wall 2 of a stator. The rotation axis is for example situated perpendicularly to the drawing plane outside the zone of the sketch. The pump is for example a molecular pump with a spiral rib 3 disposed along the wall 2 of the stator from the gas inlet to the gas outlet. An essential feature for reducing the back-flow and for improving the pumping efficiency is the gap between the rib 3 and the smooth wall 1 of the rotor. According to the invention, this gap is reduced by an ice layer derived from a gas which must be compatible with the gases to be pumped and which can be condensated. This layer is applied onto the rib 3. To this end, the rib 3 is a hollow rib and defines a coolant channel allowing a coolant fluid to be circulated. Prior to the start-up of the pump, a coolant fluid is injected into this channel 4 and simultaneously an appropriate gas, for example $CO_2$, is fed to the pumping space of the pump. This gas condenses preferably on the cooled surfaces of the rib 3, thus creating an ice layer 5. The consistency of the ice can be adapted to the needs by selecting an appropriate coolant temperature. The thickness of the ice layer is defined by the quantity of the gas injected into the pumping space, and it can readily be tolerated that the rotor slightly grinds the ice layer during the start-up phase. Thus, a controlled reduction of the gap and a selective deposition of ice on the coolant channel are ensured due to the thermal inertia of the remaining parts of the installation.

Carbon dioxide $CO_2$ is well adapted as a gas for creating the ice layer, for example in pumps which pump light gases such as helium or hydrogen isotopes. For this reason, the device according to the invention is particularly adapted to the treatment of gases derived from a nuclear fusion reactor. The considerable reduction of the gap between the rotor and the stator allows a substantial increase of pumping efficiency and simultaneously a better final vacuum pressure. Compared with a pump without the measures according to the invention, the pump size, the weight, the stored energy and the heat losses are reduced. The device is not sensitive to solid particles in the sucked gas flow and the $CO_2$ ice does practically not produce any activation products due to gamma or neutron radiation in the case of the pumped gas containing radio-active isotopes such as tritium. As the vapour pressure of $CO_2$ is very low at 20 K. (lower than $10^{-12}$ mbar), the ice layer is very stable.

Commonly used sealing materials do not withstand very long unfavourable conditions due to nuclear radiation or solid particles or due to an interaction with the gas to be pumped. For this reason, the pumping characteristics of known pumps become rapidly worse under these conditions and require an expensive maintenance. Contrary thereto, the ice layer in the device according to the invention can easily be renewed and adapts itself automatically to the shape of the gap during operation. The ice layer can in a way be considered as a lubricating layer, which melts at the surface in contact with the facing wall.

Figure 2:
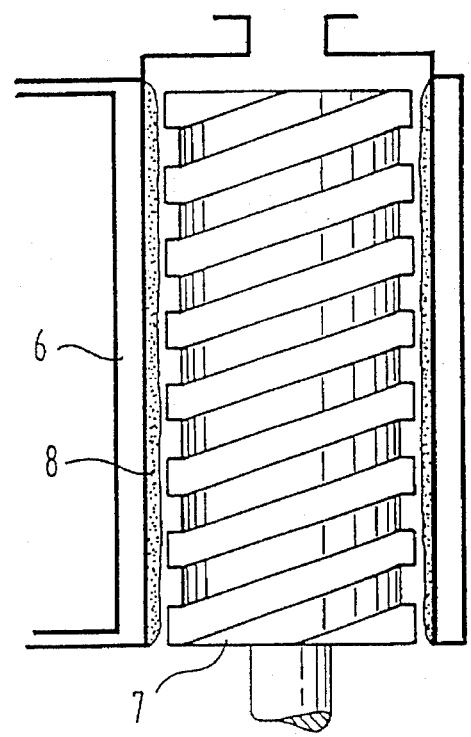
FIG. 2 shows the application of the FIG. 1 device to a vacuum pump of the Holweck type.

The gap between the movable and the static or stationary part of a pump can extend over the entire height of a cylindrical wall which is the case for example for a spiro-molecular pump of the Holweck type shown in FIG. 2. Here, the stator 6 is double-walled and a cryo coolant circulates in the interspace. Therefore an ice layer 8 is formed along the entire inner wall of the stator in the zone between the stator and the rotor 7.

Of course, the invention is not restricted to the cited molecular pump, but can be applied to any other pump intended to pump gases at very low temperatures and conceived to present a very small gap between rotor and stator. But the device according to the invention can further be used as a seal between parts in relative movement of a cryo circuit, for example for shaft outlets or for valves. In the last mentioned case, the device according to the invention can be considered as a consumable seal for the valve seat.

Figure 3:
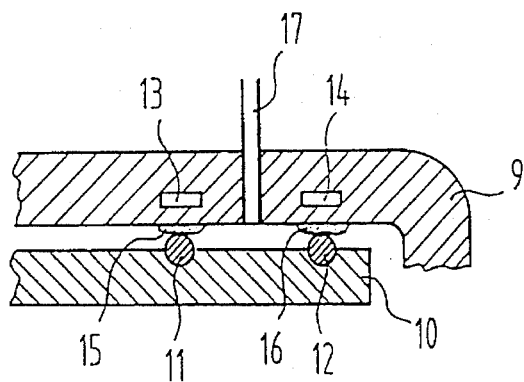
FIG. 3 shows the application of the FIG. 1 device to a valve having two sealing lines.

FIG. 3 shows a cross-section through a portion of a valve in which the device according to the invention can equally be applied. A valve casing 9 presents a valve opening which should be imagined on the left side of the shown valve portion. A disk-shaped valve member 10 is applied to the valve body when the valve is closed via two sealing lines surrounding the opening, and it is moved by means not shown. Along the sealing lines, sealing joints 11 and 12, for example metal joints, are inserted into grooves of the obturation member (or the valve body), whereas coolant channels 13 and 14 are provided face to face thereto in the valve body or the obturation member respectively, for creating localized $CO_2$ ice layers 15, 16 along the sealing lines, if $CO_2$ gas is supplied to the zones which are cooled down. Between both sealing lines, a duct 17 can be provided for connection with a source of a safety gas or with a vacuum pump.

During the closing operation of the valve, the ice layer is compressed and therefore constitutes an efficient sealing joint. In this context, it is recommended to realize the ice layer less compact, i.e. with higher porosity, by conveniently selecting the cooling conditions (speed and inlet temperature of the gas injected for forming the ice layer), thereby allowing the ice layer to be slightly crushed. The ice layer is renewed after each valve operating cycle in order to avoid any damages of the valve body by means of solid particles.

Instead of $CO_2$, which is adapted to pumps for gases coming from a nuclear fusion reactor, other ice forming gases can be employed for certain application cases, such as $CO$, $N_2$ and $Ar$, if no interaction between these materials and the gases to be treated in the installation are to be expected.

In the frame of the invention, the coolant channels can also be provided in the movable part, if the structure problems relating to placing the inlet and outlet in the movable part can be resolved in each particular case.

I claim:

1. A device for reducing a gap between a static part and a movable part in an installation which is to be operated at cryo temperature, said device comprising:

a static part;

a movable part defining a gap between said static part and said movable part;

a cryo coolant channel having a coolant fluid disposed therein, said channel being disposed in one of said static part and said movable part, said channel being disposed adjacent to said gap; and means for injecting a gas into said gap, said gas being condensable and having a liquid-solid conversion temperature above the temperature of the coolant fluid.

2. The device of claim 1, wherein the static part and the movable part are portions of a mechanical vacuum pump.

3. The device of claim 1, wherein the static part and the movable part are portions of a valve.

4. A method for reducing a gap between a static part and a movable part, a cryo coolant channel disposed in one of the static part and the movable part, the channel being adjacent to the gap, said method comprising the steps of:

feeding a gas into the gap;

condensing the gas in the gap so that the gas becomes solid; and maintaining, at least in an area of the gap, a temperature below a melting temperature of the solid.

5. The method of claim 4, wherein the static part and the movable part are portions of a mechanical vacuum pump.

6. The method of claim 4, wherein the static part and the movable part are portions of a valve.

* * * * *